United States Patent [19]

Morris

[11] Patent Number: 4,898,653

[45] Date of Patent: Feb. 6, 1990

[54] COMBINATION ELECTROLYSIS CELL SEAL MEMBER AND MEMBRANE TENTERING MEANS

[75] Inventor: Gregory J. E. Morris, Milan, Italy

[73] Assignee: The Dow Chemical Company, Midland, Mich.

[21] Appl. No.: 249,639

[22] Filed: Sep. 26, 1988

[51] Int. Cl.[4] .................. C25B 1/24; C25B 9/00; C25B 13/00

[52] U.S. Cl. .................. 204/128; 204/255; 204/256; 204/257; 204/258; 204/265; 204/279; 204/270

[58] Field of Search ............... 204/279, 256, 258, 265, 204/270, 252–255, 257, 263–264, 266, 128; 277/34

[56] References Cited

U.S. PATENT DOCUMENTS

| | | | |
|---|---|---|---|
| 1,721,407 | 7/1929 | Pechkranz | 204/254 |
| 2,306,160 | 12/1942 | Freyssinet | 277/34.3 |
| 2,785,824 | 3/1957 | Reeves | 277/34 X |
| 3,378,480 | 4/1968 | Reishagen et al. | 204/253 |
| 3,835,017 | 9/1974 | Mentone et al. | 204/224 R |
| 3,857,773 | 12/1974 | DuBois et al. | 204/256 X |
| 3,869,375 | 3/1975 | Ono et al. | 204/279 X |
| 3,964,932 | 6/1976 | Oltman et al. | 429/185 |
| 4,013,535 | 3/1977 | White | 204/252 |
| 4,026,782 | 5/1977 | Bouy et al. | 204/254 |
| 4,076,609 | 2/1978 | Mas | 204/258 |
| 4,098,670 | 7/1978 | Custer et al. | 204/252 |
| 4,107,023 | 8/1978 | Mentz | 204/269 |
| 4,111,779 | 9/1978 | Seko et al. | 204/255 |
| 4,137,144 | 1/1979 | Kenney | 204/268 |
| 4,139,448 | 2/1979 | Wallace | 204/256 |
| 4,175,024 | 11/1979 | Darlington | 204/252 |
| 4,175,025 | 11/1979 | Creamer et al. | 204/253 |
| 4,188,464 | 2/1980 | Adams et al. | 429/210 |
| 4,191,627 | 3/1980 | Specht | 204/296 |
| 4,197,206 | 4/1980 | Karn | 204/253 X |
| 4,207,165 | 6/1980 | Mose et al. | 204/258 |
| 4,217,200 | 8/1980 | Kedem et al. | 204/301 |
| 4,219,394 | 8/1980 | Babinsky et al. | 204/98 |
| 4,253,932 | 3/1981 | Mose et al. | 204/253 |
| 4,268,372 | 5/1981 | Iizima et al. | 204/252 |
| 4,268,373 | 5/1981 | Iizima et al. | 204/252 |
| 4,274,928 | 6/1981 | Cunningham | 204/98 |
| 4,279,731 | 7/1981 | Pellegri | 204/254 |
| 4,313,812 | 2/1982 | Kircher | 204/253 |
| 4,332,661 | 6/1982 | Ford et al. | 204/253 |
| 4,342,336 | 8/1982 | Satterthwaite et al. | 277/34 X |
| 4,342,460 | 8/1982 | Eng | 204/279 X |
| 4,344,633 | 8/1982 | Niksa | 204/279 X |
| 4,381,984 | 5/1983 | Kircher | 204/258 |
| 4,390,408 | 6/1983 | Kircher | 204/284 |
| 4,431,502 | 2/1984 | Ford | 204/252 |
| 4,441,977 | 4/1984 | Ford | 204/252 |

(List continued on next page.)

FOREIGN PATENT DOCUMENTS

| | | |
|---|---|---|
| 0051380 | 5/1982 | European Pat. Off. . |
| 0080288 | 11/1982 | European Pat. Off. . |
| 0118973 | 1/1984 | European Pat. Off. . |
| 2821983 | 11/1979 | Fed. Rep. of Germany . |
| 53-63284 | 6/1978 | Japan . |
| 53-146272 | 12/1978 | Japan . |
| 56-38484 | 4/1981 | Japan . |
| 58-4926 | 1/1983 | Japan . |
| 58-35272 | 8/1983 | Japan . |
| 1082867 | 3/1984 | U.S.S.R. . |
| 1078129 | 12/1964 | United Kingdom . |
| 1192245 | 5/1970 | United Kingdom . |
| 2013242 | 8/1979 | United Kingdom . |

Primary Examiner—Donald R. Valentine

[57] ABSTRACT

A combination seal and membrane tentering member suitable for use in an electrolytic cell of the filter press type. The seal/tentering member for a filter press type electrolytic cell includes an inflatable gasket member interposed between a first and second insulator members, said insulator members having a recess defining a compartment adapted for receiving the inflatable gasket member, said insulator members interposed between a pair of cell frame flanges and a membrane member interposed between the insulator members. Aqueous alkali metal chloride solution may be electrolyzed in the electrolytic cell.

11 Claims, 4 Drawing Sheets

U.S. PATENT DOCUMENTS

| | | | |
|---|---|---|---|
| 4,470,608 | 9/1984 | Warren | 277/164 |
| 4,488,946 | 12/1984 | Morris et al. | 204/98 |
| 4,490,231 | 12/1984 | Boulton | 204/263 |
| 4,493,759 | 1/1985 | Boulton et al. | 204/252 |
| 4,585,527 | 4/1986 | Northway et al. | 204/1 T |
| 4,604,331 | 8/1986 | Louis | 429/35 |
| 4,605,483 | 8/1986 | Michaelson | 204/277 |
| 4,610,765 | 9/1986 | Beaver et al. | 204/128 |
| 4,623,599 | 11/1986 | Vourlis | 429/174 |
| 4,638,109 | 1/1987 | Ford | 204/253 |
| 4,648,953 | 3/1987 | Wardle et al. | 204/237 |
| 4,654,134 | 3/1987 | Morris et al. | 204/252 |
| 4,656,104 | 4/1987 | Tucholski | 429/185 |
| 4,721,555 | 1/1988 | Grosshandler | 204/252 |
| 4,738,905 | 4/1988 | Collins | 429/36 |
| 4,748,092 | 5/1988 | Hekal | 429/35 |

COMBINATION ELECTROLYSIS CELL SEAL MEMBER AND MEMBRANE TENTERING MEANS

BACKGROUND OF THE INVENTION

This invention relates to a combination electrolysis cell sealing means and separator tentering means for a filter press type electrolytic cell, and more particularly, to a combination electrolytic cell gasket member and separator tentering device for use in filter press type electrolytic cells.

Electrolytic cells of the filter press-type are known to be used for the electrolysis of aqueous salt solutions and have been commercially employed for the production of chlorine and caustic from brine. The filter press type electrolytic cell for electrolysis of an aqueous salt solution commonly employ a plurality of frame members with electrodes held thereto and assembled in a filter press type arrangement, separated from each other by membranes, diaphragms or microporous separators, forming a plurality of anolyte and catholyte compartments. The electrodes used in the cells are generally either monopolar or bipolar electrodes.

Membranes typically used in the cells are generally available in sheet form and have ion exchange properties, for example, membrane materials employed in the cells are such as those marketed by E. I. duPont de Nemours and Company under the trademark Nafion ® and by Asahi Glass Company Ltd. under the trademark Flemion ®.

Typically, a press means is used to compress or clamp together the separators in sheet form between the sides of the frame members of the filter press cell and electrolyte is used to fill the compartments of the cell. To provide a fluid-tight seal between the frame members and the separator without damaging the separator, the electrolytic cells employ substantially flat, solid gaskets having a rectangular cross-sectional area or tubular type gaskets having a circular cross-sectional area made of elastomeric material. One or two gaskets can be used to fit between the cell frame members on a peripheral flange portion of the frame members and on either side of the membrane. While most gaskets, for the most part, can provide a liquid-tight seal the seal is generally not completely fluid-tight, i.e. liquid and gas-tight. To some extent fluid (liquid and gas) seepage occurs at the interface formed between the membrane contacting the gasket members.

The problem of fluid seepage occurs particularly in cells which employ membrane separators that utilize a support or reinforcement material in the membrane. This reinforcement material is usually used because it provides the normally weak membrane with added strength for handling and installing into industrial size membrane filter press electrolytic cells. The problem associated with the use of support or reinforcements in membranes is it allows gases and liquids to seep from the inside of the operating cell to the exterior. This seepage can cause severe damage to the outer surface of the cell peripheral surface. Fluid seepage can also exposes operating personnel to potentially hazardous chemicals. The problem of fluid seepage is aggravated by the use of pressurized cells operating under an internal electrode compartment pressure The contemporary compression-seal means now being used by industry cannot significantly block the leakage of the liquids and gases in the electrolytic cells.

Another problem associated with the use of conventional gasketing of filter press cells is membrane drying. In a conventional membrane filter press type cell operation, the membrane is usually extended past the periphery of the cell and exposed to the environment. This exposure, in time, allows the membrane to dry and possibly crack. Any cracks formed in the exposed surface of the membrane can propagate, during operation of the cell, through the membrane to the portion of the membrane which is inside the cell, i.e., the operating area of the membrane, which in turn, can cause severe operation problems such as mixing of electrolytes, that can cause corrosion of the cell's components, mixture of gases which can lead to explosions. Each situation can lead to the termination of the cell operation.

Still another problem associated with the assembly of filter press cells is, in addition to conventional gasketing, a separate and independent tentering device is normally needed to planarly dispose the membrane between the frame members of the cell. One conventional method of tentering the membrane involves personnel holding the membrane by hand between cell frames and stretching the membrane as the cell frames are compressed together. The cell gaskets in this instance are glued or taped to one of the electrode frames. In another method, the cell frames, membranes and gaskets are assembled in the horizontal position to ensure a planar placement of the membrane and gaskets, and thereafter standing the assembled cell in the upright position for operation. Still another method, the membrane and gasket are glued or taped to the cathode or anode frame prior to assembling the elements of the cell together. These approaches are unsatisfactory as they present time consuming, complex procedures, costly equipment and safety hazards to personnel. These procedures may also allow the membrane to dry and crack and thereby render it unfit for operation.

It is, therefore, desired to provide a means suitable for sealing an electrolytic cell and tentering an electrolytic separator to reduce the complexity of assembling the elements of an electrolytic cell.

It is further desired to provide a solution to the other problems discussed above by providing a device and method for insuring that the outer boundaries of a membrane stay in a moist or wet state and by providing a device and method for containment and/or control of gas and liquid seepage from the internal cell structure at the membrane/gasket interface of a membrane filter press type cell.

SUMMARY OF THE INVENTION

One aspect of the present invention is a sealing means and tentering means suitable for use in an electrolytic cell of the filter press type. The sealing and tentering means for a filter press type electrolytic cell includes an inflatable gasket member interposed between a first and second insulator members, said insulator members having a recess defining a compartment adapted for receiving the inflatable gasket member, said insulator members interposed between a pair of cell frame flanges and a membrane member interposed between the insulator members.

Another aspect of the invention is a method of sealing an electrolytic cell and tentering a membrane member in the cell using the combination seal and tentering means above.

DETAILED DESCRIPTION OF THE PREFERRED EMBODIMENTS

Figure 1:
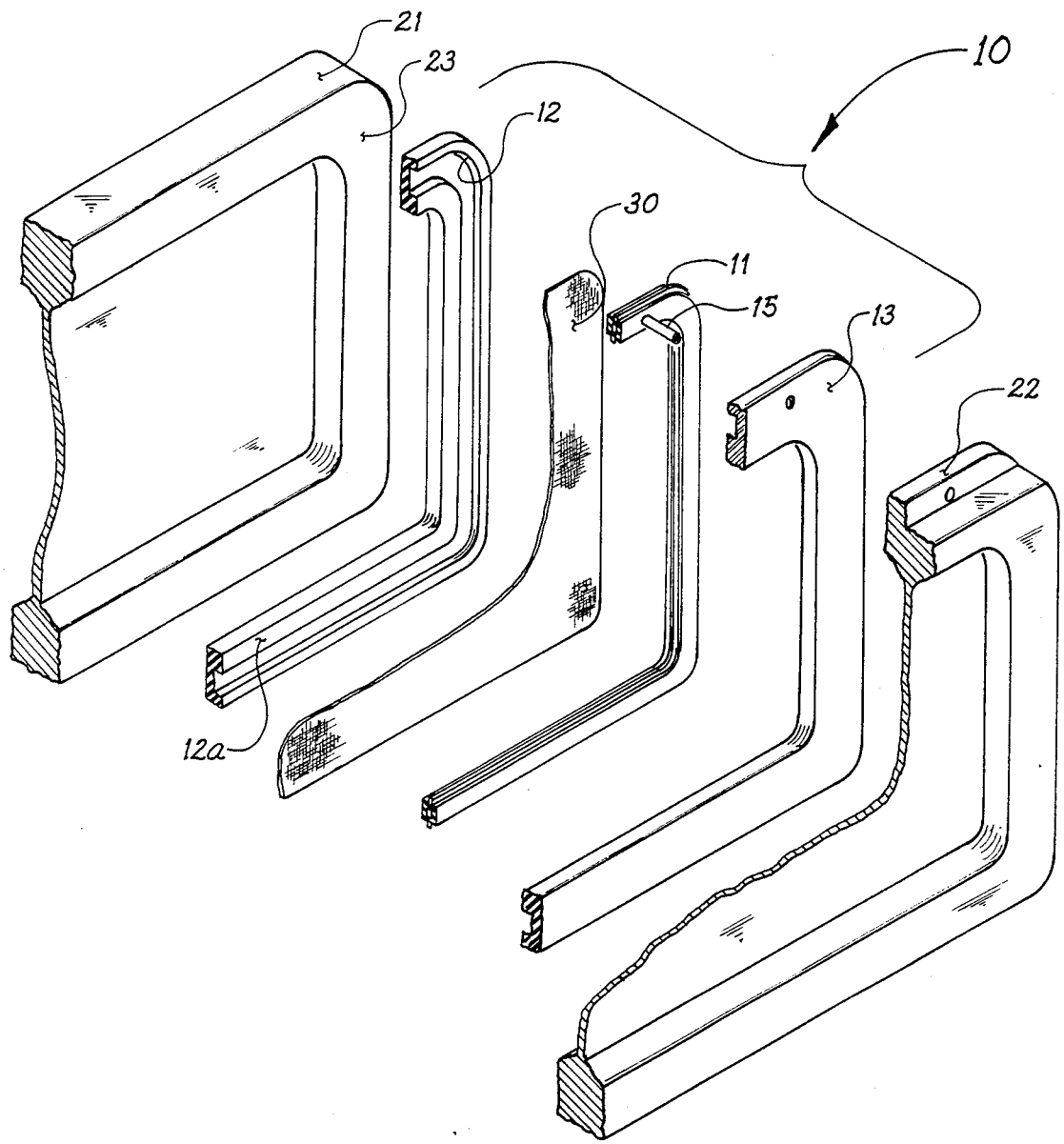
FIG. 1 is an exploded, partially broken away perspective view of an electrolysis cell with a seal and tentering member of the present invention with a membrane between two cell frame members.
Figure 2:
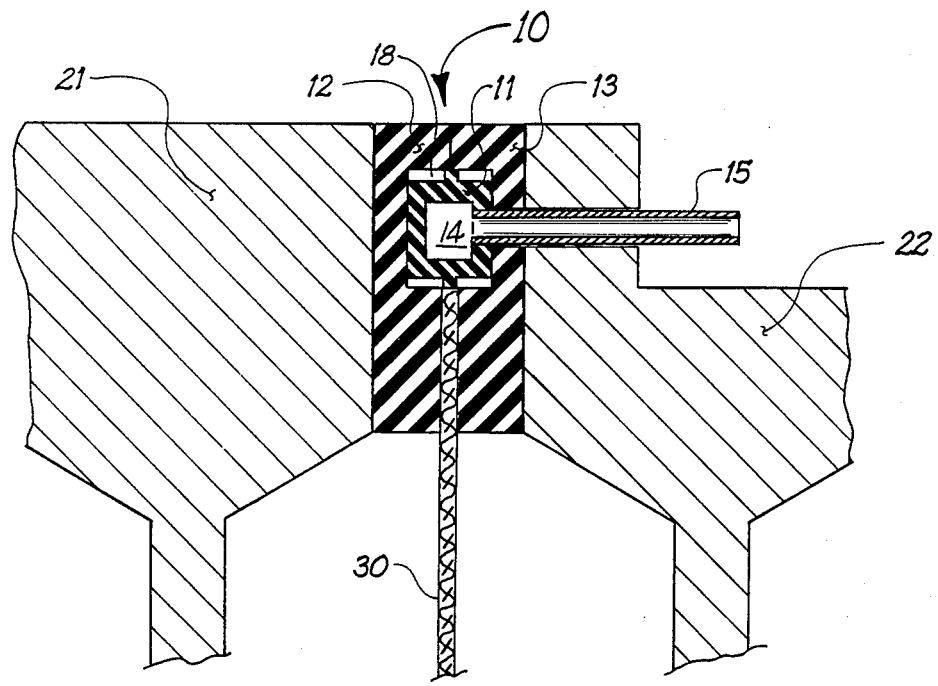
FIG. 2 is a cross section view of a sealing and tentering member of the invention with a membrane between two cell frame members.
Figure 3:
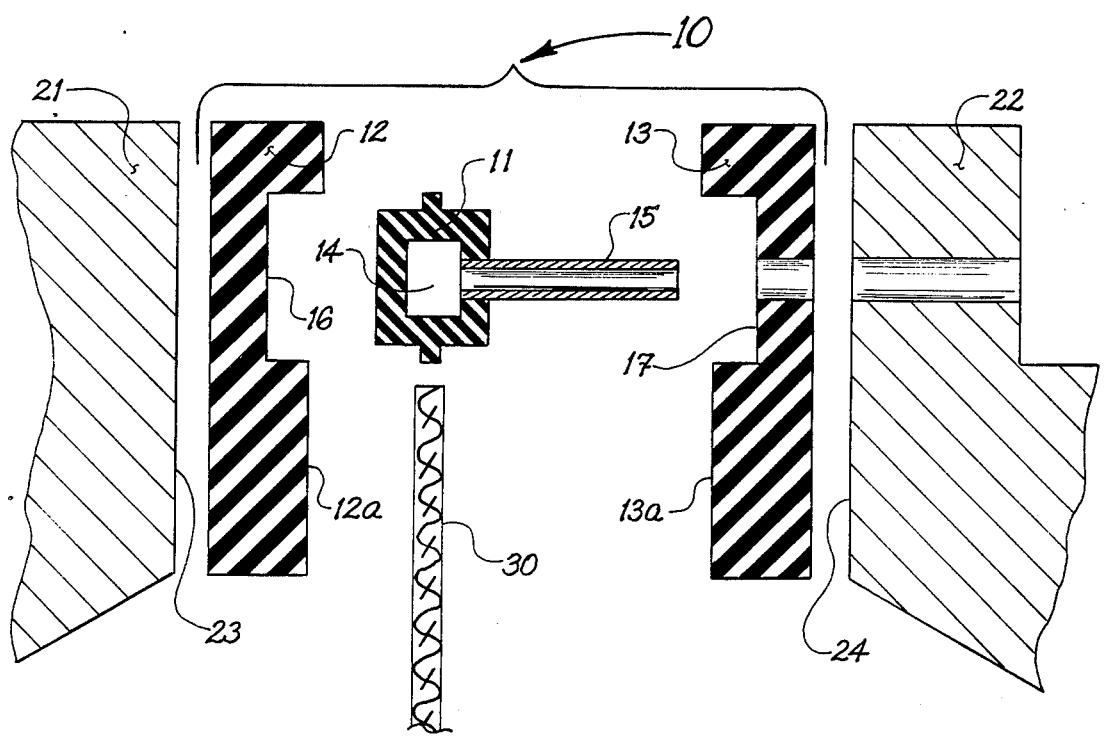
FIG. 3 is an exploded, cross-sectional view of FIG. 2.

With reference to FIGS. 1, 2 and 3 there is shown a combination electrolysis cell sealing member and electrolysis cell separator tentering member, generally indicated by numeral 10, interposed between two electrolytic cell frame members 21 and 22 for an electrolysis cell of the filter press type. The combination sealing member and tentering means will be referred to herein as the seal/tentering member 10. However, it is understood that the seal/tentering member is used for the dual purpose of sealing a filter press type electrolytic cell for and holding or tentering a membrane used in a filter press type electrolytic cell.

The seal/tentering member 10 includes an inflatable gasket member 11 interposed between a first and second insulator members, 12 and 13, respectively, all which are interposed between the electrolysis cell frame members 21 and 22. The gasket member 11 is a hollow body, generally tubular in shape, with a fluid space 14 in fluid communication with a conduit member 15 passing through, in this instance, the cell frame member 22 and to the outer surface of the cell frame member 22. The conduit member 15 supplies a fluid such as a liquid or gas to inflate the gasket 11 and provide the necessary pressure to form a fluid-tight (liquid and gas) seal between the cell frames member 21 and 22. Advantageously, the seal pressure between individual cell frame members can be adjusted using the inflatable gasket 11. In addition, by utilizing gasket 11, the electrode spacing can be adjusted, thereby fine tuning cell operation. The gasket 11 may eliminate the requirement for a hydraulic or spring squeezing system for a cell stack element, i.e., a series of frame members in filter leaf arrangement, by providing sufficient pressure within the internal portion of the gasket to seal the frame members. A suitable gasket 11 used in the present invention can be, for example, a commercially available gasket from Sigco of Charlotte, N.C.

A membrane member 30 is interposed between the insulator members 12 and 13 and the insulator members 12 and 13 each have a recess 16 and 17, respectively, defining a compartment 18 adapted for receiving the inflatable gasket member 11. The insulator members 12 and 13 are interposed between cell frame member 21 and 22 flanges portions 23 and 24, respectively. The insulator members, in this instance, are C-shaped when viewed in cross section and are adjacent each other, diametrically opposed, in a mirror-like manner to form the compartment 18 to receive the gasket member 11. The membrane 30 is interposed between the bottom "arm" or flange portions 12a and 13a of the "C" of the C-shaped insulator members 12 and 13, respectively, to form a seal at the interface between the membrane and flanges 12a pk and 13a. The insulators 12 and 13 are used to house the gasket 11 and also isolate, electrically, the two cell frame members 21 and 22. In addition, the insulators 12 and 13 provide a means for holding the membrane in place during operation. For example, the membrane may be attached to the insulators 12 and/or 13 by any suitable attachment means.

Figure 4:
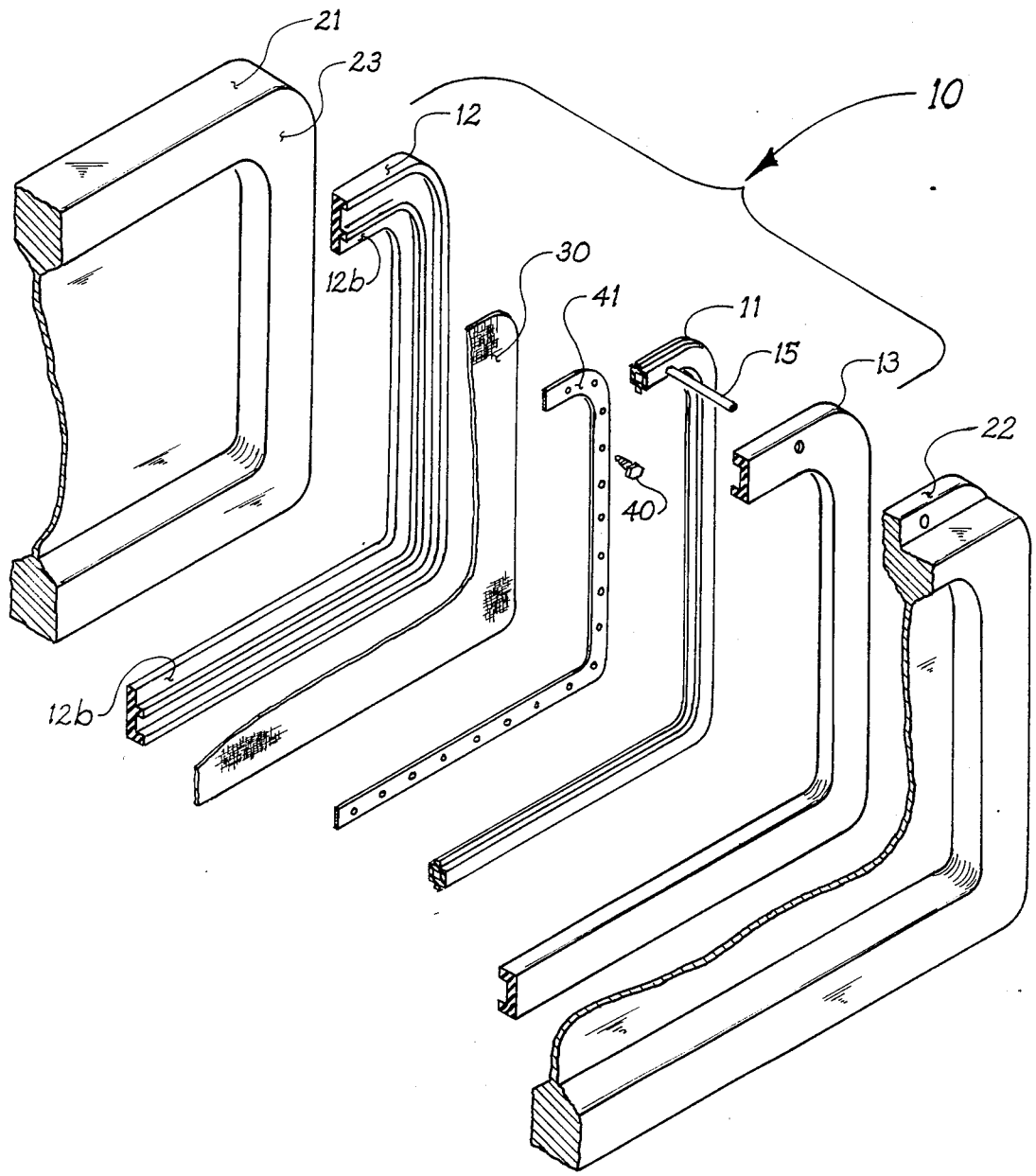
FIG. 4 is another embodiment of the sealing and tentering member of the present invention showing an exploded, partially broken away, perspective view of the sealing and tentering member of the invention with a membrane between two cell frame members.
Figure 5:
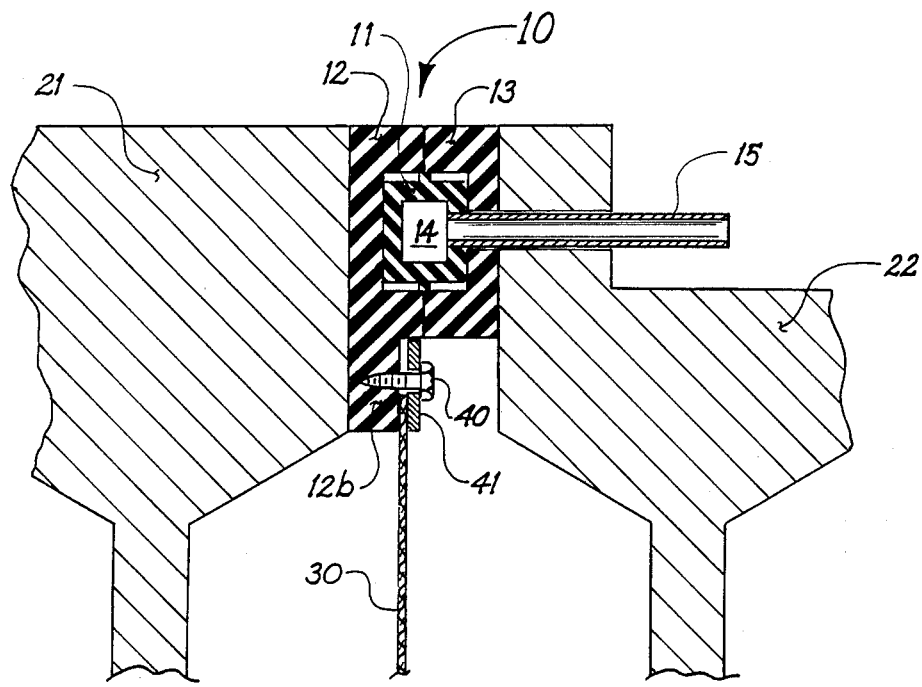
FIG. 5 is a cross-sectional view of the embodiment of the invention shown in FIG. 4.
Figure 6:
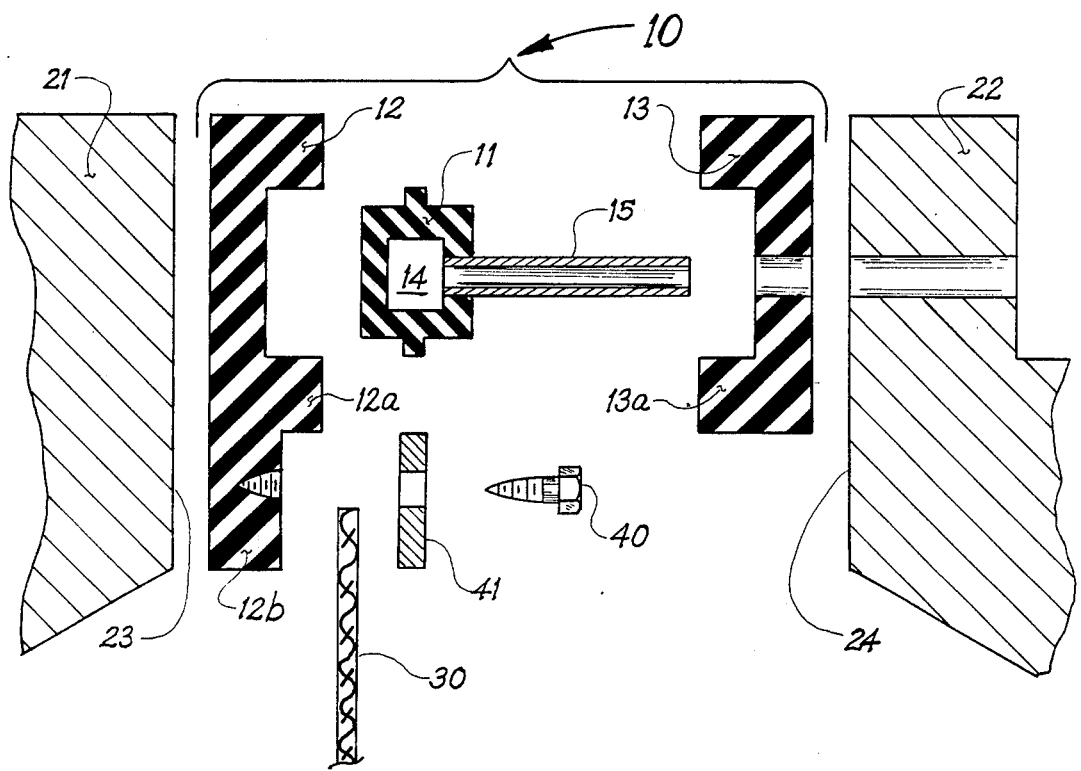
FIG. 6 is an exploded view of FIG. 5.

FIGS. 4, 5 and 6 show another embodiment of the present invention including at least one of the insulator member 12 with a flange extension portion 12b adapted for removably fastening a membrane member 30 thereto. In this instance, one of the insulators 12 is an "F-shaped" insulator member when viewed in cross section, and the other insulator 13 is a "reversed C-shaped" insulator member when viewed in cross section, form in a "P-shaped" assembly in toto when assembled and viewed in cross section.

A fastening means such as a plurality of threaded screws 40 and plate member 41 is used to securely fasten and tenter the membrane 30 to the insulator flange exterior portion 12b of insulator member 12.

While not shown in the Figures of the present invention, there are other embodiments which will become apparent to one skilled in the art after reading the description herein, for example, a fastening member can be used to attach one or both insulators 12 and 13 to the cell frame members 21 and/or 22. Optionally, the seal/tentering member 10 may include a groove or recess on its insulator members 12 and 13 with a seal or gasket member disposed within the groove or recess for further sealing the interface between the insulator member 12 and the cell frame 21 and/or the interface between the insulator 13 and the cell frame 22. In another embodiment, the cell frame flange portion 23 and 24 may have a recess therein with a gasket member for farther sealing the interface between the insulator 12 or 13 and the cell frames 21 or 22. The groove and seal member can also be used on the flange exterior portions 12b of the first insulator member for further sealing the interface between the frame member 21 and the first insulator 12.

The components of the seal/tentering member 10 of the present invention should be made of an electrically insulating material. It is desirable that the components, for example the gasket 11 and insulators 12 and 13 be flexible, and preferably resilient, in order to aid in achieving leak-tight seals in the electrolytic cell.

The gasket 11 and insulator 12 and 13 of the present invention should exhibit a high degree of resistance to corrosion by a variety of different electrolytes and products of electrolysis. However, the gasket 11 and insulators 12 and 13 should show particular resistance to corrosion when the electrolyte which is electrolyzed is an aqueous solution of an alkali metal chloride, for example, an aqueous solution of sodium chloride. An aqueous solution of alkali metal chloride may be electrolyzed in a cell which comprises a separator between each anode and adjacent cathode. The gasket 11 and insulators 12 and 13 should be resistant to wet chlorine produced during operation of such a cell.

The gasket 11 and insulators 12 and 13 are suitably made of an organic polymeric material which material may be, for example, a polyolefin e.g. polyethylene or polypropylene: a hydrocarbon elastomer, e.g. an elastomer based on ethylene-propylene copolymer, an ethylene-propylene-diene copolymer, natural rubber or a styrene-butadiene rubber: or a chlorinated hydrocarbon, e.g. polyvinyl chloride or polyvinylidene chloride. It is particularly desirable that the material of the gasket and insulators be chemically resistant to the liquors in the electrolytic cell, and when the cell is to be used in the electrolysis of aqueous alkali metal chloride solution the material may be fluorinated polymeric material, for example polytetrafluoroethylene, polyvinyl fluoride, polyvinylidene fluoride, fluorinated ethylene-propylene copolymer: tetra-fluoroetheylene-hexa-fluoropropyl copolymer, or a substrate having an outer layer of such a fluorinated polymeric material.

Elastomeric solids are suitable materials for use as gaskets and insulator members. Examples of the elastomeric solids include chlorobutadiene rubber (neoprene), chlorosulfonated polyethylene (Hypalon ®), ethylene-propylene dimonomer (EPDM), or gum rubber.

The hardness of the gasket 11 and insulator members 12 and 13 is not critical and any suitable hardness may be selected for the gasket and insulators. Preferably, the gasket and insulators have a low degree of hardness which allows the gaskets and insulators to fill in irregularities on the frame members and thus permit reduced tolerances which minimizes, for example, machining of metal electrolysis cell frame members and thus reduces production costs. For example, an elastomeric gasket and insulators having a hardness of from about 50 durometer to about 90 durometer are suitable.

The thickness of the gasket 11 as insulators 12 and 13 are also not critical, but a suitable thickness should be selected for ease of manufacture of the gasket and insulators used. For example, the thickness of the elastomeric gasket and insulators having a thickness of from about 1.5 mm to about 5 mm are suitable.

The gasket 11 and insulators 12 and 13 of the present invention may be used in any suitable filter press type cell, the structure and function of its central components being well known to one of skill in the art. For example, electrolytic cells of the filter press type comprising any number of alternating anodes and cathodes may be used. Electrolytic cells of the aforementioned types are used on a large scale for the production of chlorine and caustic alkali.

Preferred filter press electrolytic cells for employing the present invention are bipolar or monopolar membrane cells in which the electrodes are oriented generally vertically. Suitable bipolar filter press membrane electrolytic cell in which the gasket and insulators may be used include, for example, those described in U.S. Pat. No. 4,488,946. Suitable filter press monopolar membrane electrolytic cells include those described in U.S. Pat. No. 4,056,458, issued Nov. 1, 1977, to G. R. Pohto et al.: U.S. Pat. No. 4,210,516, issued July 1, 1980, to L. Mose et al. and U.S. Pat. No. 4,217,199, issued Aug. 12, 1980, to H. Cunningham.

The electrolytic cell comprises an anode or a plurality of anodes and a cathode or a plurality of cathodes, and one or more gaskets and insulators of the present invention compressed together with a separator between each anode and adjacent cathode which divides the cell into separate anode and cathode compartments.

The electrolytic cell is equipped with means for charging electrolyte to the cell and with means for removing the products of electrolysis from the cell. In particular, the anode compartments of the cell are provided with means for feeding aqueous alkali metal chloride electrolyte to the cell, suitably from a common header, and with means for removing products of electrolysis form the cell. Similarly, the cathode compartments of the cell are provided with means for removing products of electrolysis from the cell, and optionally with means for feeding water or other fluid to the cell. The electrolysis process may be operated by charging electrolyte to the electrolytic cell, electrolyzing the electrolyte therein, and removing the products of electrolysis from the electrolytic cell.

The separator used in the electrolytic cell may be a hydraulically permeable diaphragm or a substantially hydraulically impermeable ionically-permselective membrane.

In an electrolytic cell equipped with a hydraulically-permeable microporous diaphragm and where an aqueous alkali metal chloride solution is electrolyzed in such a cell the solution is charged to the anode compartments of the cell and chlorine produced during electrolysis is removed therefrom, the solution passes through the diaphragm to the cathode compartments of the cell and hydrogen and aqueous alkali metal hydroxide solution produced by electrolysis are removed therefrom.

In an electrolytic cell equipped with an essentially hydraulically impermeable cationically-permselective membrane, aqueous alkali metal chloride solution is charged to the anode compartments of the cell and chlorine produced during electrolysis and depleted alkali metal chloride solution are removed from the anode compartments, alkali metal ions are transported across the membranes to the cathode compartments of the cell to which water or dilute alkali metal hydroxide solution may be charged, and hydrogen and alkali metal hydroxide solution produced by the reaction of alkali metal ions with hydroxyl ions are removed from the cathode compartments of the cell.

Preferably, inert flexible separators having ion exchange properties and which are substantially impervious to the hydrodynamic flow of the electrolyte and the passage of gas products produced in the cell are employed. Suitably used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid groups by processes such as hydrolysis. One example of a suitable membrane material having cation exchange properties is a perfluorosulfonic acid resin membrane composed of a copolymer of a polyfluoroolefin with a sulfonated perfluorovinyl ether. A composite membrane sold commercially by E. I. duPont de Nemours and Company under the trademark Nafion ® is a suitable example of this membrane.

Another example of a suitable membrane is a cation exchange membrane using a carboxylic acid group as the ion exchange group. Carboxylic acid type cation exchange membranes are available commercially from the Asahi Glass Company under the trademark Flemion ®.

The electrodes have frame members such as 21 and 22 which have generally planar opposing surfaces such as surfaces 23 and 24 between which the gasket 11 and insulators 12 and 13 are compressed. The frames are generally of a thick solid construction capable of with-standing the considerable compression force exerted upon the frames when the filter press cell is assembled. To prevent the seal/tentering means from "popping out" under compression, the frames should be substantially flat. To avoid the considerable expense of machining and finishing, the opposing planar surfaces are free of recesses or grooves. However, such recesses can be incorporated in the frame flange portion 23 and 24 as described above if so desired.

Electrode frame components may be in the shape of rectangular bars, C or U channels, cylindrical tubes, elliptical tubes as well as being I-shaped or H-shaped. Preferably, the frame components are in the shape of an I-shaped cross section as shown in FIG. 1.

The materials of construction for frame components may be any which are resistant to corrosion by the electrolytes and the products of electrolysis. For example, metal anode frames used in the electrolysis of alkali metal chlorides are constructed of valve metals such as titanium, tantalum, or tungsten and their alloys, with titanium being preferred. Cathode frames may be constructed of metals such as iron, steel, stainless steel, nickel, or alloys of these metals may be used as well as plastic materials such as polypropylene, polybutylene, polytetrafluoroethylene, FEP, and chlorendic acid based polyesters.

During assembly of the filter press electrolytic cell, pressing means such as tie bolts tightened around the perimeter of the cell or hydraulic cylinders pressing against a mobile platen against the cell frame members is used. The pressing means bonds the individual electrodes, anodes, and cathodes alternately arranged, together. An adjacent electrode pair, a cathode and an anode, are compressed together so that the seal/tentering means is compressed. The electrodes are separated by the individual seal/tentering means which is inserted therebetween which contains the separator interposed between the insulators. As the electrodes are compressed together by the application of a suitable closure force, the gasket is filled with fluid in a manner which effects a fluid-tight seal between adjacent electrode frames, as well as securing the separator between the inside surface of the insulator means to avoid any undesired slippage.

What is claimed is:

1. A combination sealing means and tentering means for a filter press type electrolytic cell comprising:
an inflatable gasket member interposed between a first and second insulator members, each insulator member having a recess such that when the insulators are assembled together define a compartment adapted for receiving the inflatable gasket member, said insulator members interposed between a pair of cell frame flanges and a membrane member interposed between the insulator members.

2. The gasket of claim 1 including a means for removably fastening the membrane member to a surface portion of one of the insulator members.

3. The gasket of claim 1 including a recess portion in a first side wall of at least one of the insulator members adapted for receiving a seal member.

4. The gasket of claim 3 wherein the seal member is at least one O-ring type seal member.

5. A cell assembly comprising at least two frame members, a separator and a sealing means of claim 1.

6. A method of sealing an electrolytic cell comprising (a) providing a seal/tentering member comprising an inflatable gasket member interposed between a first and second insulator members, said insulator members having a recess defining a compartment adapted for receiving the inflatable gasket member, said insulator members interposed between a pair of cell frame flanges;

(b) fastening a sheet-like separator against at least one of the insulator members of the seal/tentering member;

(c) interposing the seal/tentering member with separator between at least a first frame member and a second frame member, the separator spacing apart an anode and a cathode compartments defined by the first and second frame members and the separator; and (d) compressing the seal/tentering member with separator and the first and second frame members together.

7. A method of operating an electrolytic cell comprising (a) providing a seal/tentering member comprising an inflatable gasket member interposed between a first and second insulator members, said insulator members having a recess defining a compartment adapted for receiving the inflatable gasket member, said insulator members interposed between a pair of cell frame flanges;

(b) fastening a sheet-like separator against at least one of the insulator members of the seal/tentering member;

(c) interposing the seal/tentering member with separator between at least a first frame member and a second frame member, the separator spacing apart an anode and a cathode compartments defined by the first and second frame members and the separator; and (d) compressing the seal/tentering member with separator and the first and second frame members together;

(e) feeding an aqueous alkali metal halide solution to the electrolytic cell; and (f) passing an electrical current from the anode to the cathode such that a halide is evolved at the anode.

8. An assembly for a filter press type electrolytic cell comprising (a) at least two adjacent insulation members interposed between two electrolytic cell frame members, said insulation members having a recess therein defining a compartment when contacting each other for receiving an inflatable gasket member;

(b) a fluid-inflatable gasket member interposed between the two adjacent insulation members within the compartment; and (c) a means for passing fluid in or out of said gasket for inflating or deflating said gasket member.

9. The cell assembly of claim 8 wherein insulators are diametrically opposed and "C-shaped" in configuration when viewed in cross section.

10. The cell assembly of claim 8 wherein at least one of the insulator members includes a flange portion for releasably fastening a membrane thereto.

11. The cell assembly of claim 10 including a means for releasably fastening a membrane to the flange portion.

* * * * *

UNITED STATES PATENT AND TRADEMARK OFFICE
CERTIFICATE OF CORRECTION

PATENT NO. : 4,898,653

DATED : February 6, 1990

INVENTOR(S) : Gregory J. E. Morris

It is certified that error appears in the above-identified patent and that said Letters Patent is hereby corrected as shown below:

Column 4, Line 6; delete "pk".

Column 5, Line 4; after "styrene-butadiene rubber" correct the colon to a semi-colon.

Column 5, Line 13; after "copolymer" correct the colon to a semi-colon.

Signed and Sealed this

Ninth Day of July, 1991

Attest:

HARRY F. MANBECK, JR.

*Attesting Officer*  *Commissioner of Patents and Trademarks*